Aug. 28, 1956  N. F. ANDREWS  2,760,790
COUPLING BIASED OPEN BY GRAVITY
Filed June 11, 1953
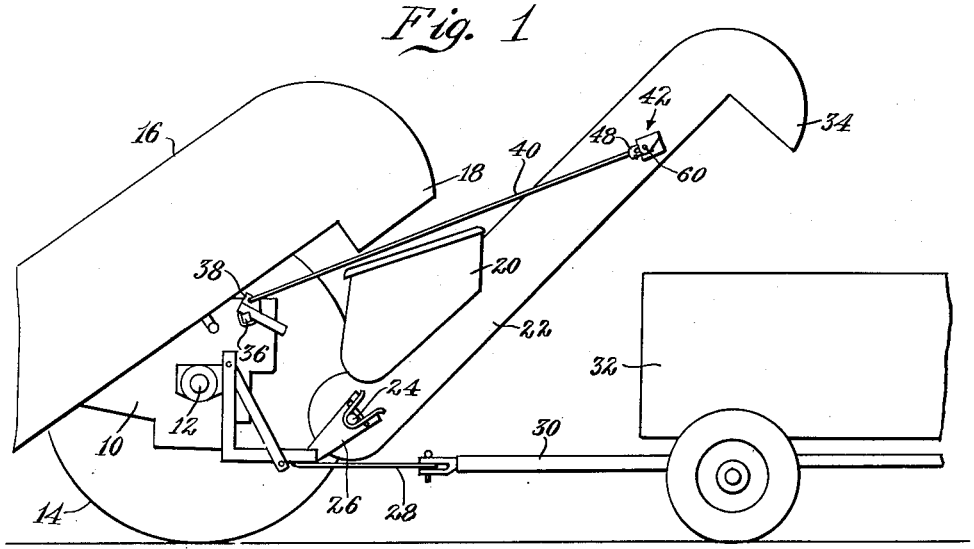
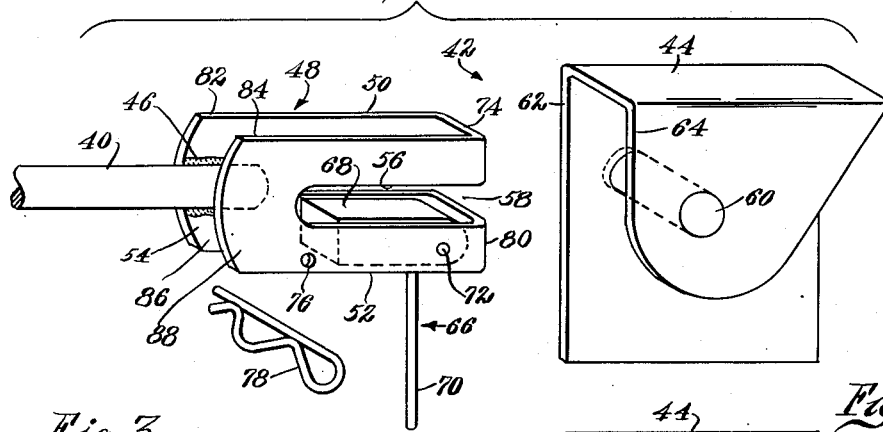
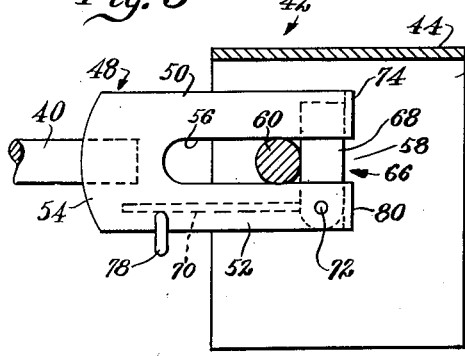
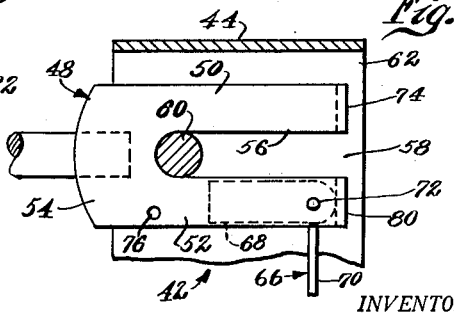
INVENTOR.
N. F. Andrews
BY
Attorneys

United States Patent Office 2,760,790
Patented Aug. 28, 1956

2,760,790

COUPLING BIASED OPEN BY GRAVITY

Norman F. Andrews, Ankeny, Iowa, assignor to Deere Manufacturing Co., Dubuque, Iowa, a corporation of Iowa Application June 11, 1953, Serial No. 361,022

2 Claims. (Cl. 280—504)

This invention relates to a coupling and more particularly to a quickly releasable and connectible coupling usable between related parts that are subject to both compression and tension.

The invention finds its greatest utility in part of the means for releasably connecting a wagon elevator to the rear of a corn harvester, for example. In such instance, the wagon elevator is pivoted at its lower end to the harvester and is articulate about that pivot relative to the harvester. The harvesting machine will usually include means for raising and lowering the wagon elevator somewhat about the aforesaid pivot and this means includes a rod or equivalent connection to an upper portion of the elevator. In dismantling of the harvester, it is desirable to remove the wagon elevator. Accordingly, some form of quickly releasable connection is desirable in the rod or its equivalent connection so that this connection can be released and the wagon elevator subsequently disconnected at its pivotal connection with the harvester. The coupling or quickly releasable connection in the rod should be of the type that will maintain its effectiveness during operation of the machine but which can be readily released so that the removal of the wagon elevator is a one-man operation.

According to the present invention, such quickly releasable coupling is provided, preferably taking the form of a first member in the form of a U having an open end out of which a second member will normally pass unless restrained. One of the legs of the U carries an L-shaped latch and one of the legs of the L normally projects across the open end of the slot of the U to prevent disconnection of the second member. The latch is normally retained in place by releasable means such as a removable pin, so that during normal operation the obstructing leg of the L establishes the necessary connection. The slot formed by the U is sufficiently long to permit the second member to run back and forth in the slot as the wagon elevator is moved relative to the harvester by causes other than the adjusting means, as by contact with the trailing wagon. Furthermore, the relative movement permitted by the length of the slot is utilized to effect release of the latch, since when the releasable means or pin is withdrawn, the latch, being biased in one direction, moves in that direction and withdraws the latch from its obstructing position.

It is an important feature of the invention that the latch is so constructed that the portion thereof that is engaged in tension is of substantial strength and is further backed up by an abutment on the U-shaped member so that there is little, if any, possibility of destroying the latch in actual use. Furthermore, the latch is so constructed that the member that runs in the slot may have free movement clear of the latch, except for the obstructing portion of the latch, whereby the movable member, in compression, engages the U-shaped member and not the latch, thus permitting the second portion of the latch to be constructed of relatively lighter material. A further feature of the invention resides in weighting the latch in such manner as to achieve the necessary bias for moving the latch out of locking position.

The foregoing and other important objects and desirable features inherent in and encompassed by the invention will become apparent as a preferred embodiment of the invention is disclosed in detail in the following description and accompanying sheet of drawings in which Fig. 1 is a fragmentary side elevational view of the rear portion of a harvesting machine and trailing wagon, illustrating one environment in which the improved coupling may be used.

Fig. 2 is a perspective view on an enlarged scale, showing in exploded relation the various components of the coupling, these parts being illustrated in separated positions.

Fig. 3 is a sectional view, substantially on the scale of Fig. 2, showing the parts when connected.

Fig. 4 is a view similar to Fig. 3 but showing the parts in the positions they will occupy just prior to either connection or disconnection.

As indicated above, the invention finds its greatest utility in a harvester and wagon elevator association; although, other uses will be obvious. On the basis of the foregoing, a harvesting machine and trailing wagon have been chosen for purposes of illustration. The harvester is of the mobile type, preferably being mounted on an agricultural tractor of conventional type, which tractor includes a rear body portion 10 having an axle structure at opposite ends of which are keyed traction wheels, only one of which is shown at 14. The harvester includes harvesting means (not shown) which operates to deliver harvested crops to an upwardly and rearwardly inclining elevator 16 having a discharge end 18 leading to a hopper 20 forming part of an upwardly and rearwardly inclined wagon elevator 22. The lower end of the wagon elevator is pivotally supported at 24 on a bracket 26 carried at the rear of the tractor body 10. The bracket 26 includes an adjoining drawbar portion 28 to which is connected the tongue 30 of a trailing wagon 32. The position of the wagon elevator is such that its discharge end 34 delivers to the wagon or trailer 32.

As part of the equipment of the tractor on which the harvester is mounted, there is provided a rockshaft 36 to which is keyed an arm 38. A rod 40 is connected at one end to the arm 38 and is connected at its other end to an upper portion of the wagon elevator by a coupling designated generally by the numeral 42.

Familiarity with the environmental structure is assumed, and that is deemed sufficient to justify omission of details that are not important here. However, the U. S. patent to Andrews 2,536,899 may be referred to as a representative harvester disclosure.

In normal operation of the machine and the towed wagon, little, if any, relative articulation between the harvester and the wagon elevator will occur, except in conditions in which the ground contour varies rather sharply. Therefore, the weight of the wagon elevator 22 normally exerts a tensional force on the rod 40 and coupling 42. Adjustment of the wagon elevator by means of the rockshaft 36 and arm 38 may be ignored. In such cases of extreme variation in ground contour, as suggested above, it will be obvious that the wagon elevator might possibly contact the wagon 32, thus placing the rod 40 and coupling 42 in compression. Accordingly, it is desirable that some lost motion be provided in the coupling, the details of which will be pointed out below. Furthermore, this lost motion is an important part of the means for effecting release and reconnection of the coupling.

The rod 40 comprises a first element, and a bracket 44 comprises a second element, the latter being carried on one side wall of the wagon elevator 22. It will be understood that a similar bracket is located at the other side and that there will be, accordingly, a second rod 40 and a second coupling 42. Since these are identical, a description of one will suffice.

Rigidly secured to the free or rear end of the rod 40, as by welding at 46, is a first member 48 of U-shaped construction having first and second or upper and lower legs 50 and 52 and a transverse bight portion 54 which is proximate to the free end of the rod 40. The legs 50 and 52 define a slot 56 that runs along the line of tension and compression and which is open at its rear end at 58.

The bracket 44 may be of substantially strong sheet metal bent upon itself to carry a second member in the form of a transverse pin 60, the bracket having opposite side walls 62 and 64 within which the U-shaped member is receivable, the pin 60 passing or running in the slot 56. Because of the open end of the slot 58, the pin 60 may move out of the slot, unless restrained, when tensional forces are applied to the coupling 42.

In order to retain the pin 60 within the slot 56, the coupling includes a latch, designated generally by the numeral 66 and preferably taking the form of an L having first and second elongated parts or legs 68 and 70. This L-shaped latch is disposed alongside the U-shaped member 48 and pivot means in the form of a pivot pin 72 interconnects the lower leg 52 of the U to the corner of the L 66 and at one end of the rigid elongated part or leg 68, thus pivotally mounting the latch or L 66 for swinging between first and second positions. The first position is shown in Fig. 3 and the second position is shown in Figs. 2 and 4.

In its first position, the L or latch 66 is disposed so that its leg or part 68 projects across the slot 56 in obstructing relationship to the open end 58 of the slot; and the other leg 70 of the L runs parallel to the slot 56 and extends toward the bight 54 of the U. One feature of the invention will be noted in this respect: The leg 70 of the L is absolutely clear of the slot 56 and the pin 60 may run between the leg 68 and the closed end of the slot. In this position of the L 66, the free end of its leg or part 68 is retained by abutment means 74 formed on the upper leg 50 of the U 48. Consequently, the latch cannot rotate in a clockwise direction and confines the pin 60 against escape through the open end of the slot. In order that the latch may be otherwise retained in that position, the lower leg 52 of the U 48 is apertured at 76 (Figs. 2 and 4) to receive releasable means in the form of a pin 78 of the spring type. This pin is so positioned as to intercept the leg 70 and thus to prevent counterclockwise movement of the latch L about the pivot point 72.

In the preferred embodiment of the invention illustrated, each leg 50 and 52 of the U 48 is in the form of a loop, the upper leg 52 having its rear end closed to provide the abutment 74. The rear end of the lower leg 52 is closed at 80, and in effect provides a second abutment in cooperation with the abutment 74. Because of the looped nature of the legs 50 and 52, it may be said that each of the legs has opposite walls 82 and 84 and 86 and 88, respectively, between which walls the latch 66 is contained.

When the latch is in its second position (Fig. 4), the first leg or part 68 lies along the lower leg 52 of the U 48 and is completely clear of the slot 56. The leg 70, which was formerly lying along the slot 56, projects downwardly or outwardly and away from the U. Thus, the pin 60 is free to move out of the end 58 of the slot 56.

In normal operating position of the coupling parts (Fig. 3) the pin 60 is restrained against moving out of the slot 56 because of the obstructing relationship of the leg or part 68 of the L-shaped latch 66. Since the other leg 70 of the latch is free or clear of the slot 56, the pin 60 may move back and forth between the first stop established by the closed end of the slot 56 and the obstructing leg or part 68 of the L as retained by the second stop or abutment 74, thus affording limited lost motion, particularly when compressive forces are applied to the coupling. The pin 78 is, of course, in place during this phase of operation. When it is desired to disconnect the coupling, the pin 78 is first removed. Since the weight of the elevator 22 exerts a tensional force on the coupling, the pin 60 will be up against the leg or rigid elongated part 68 of the L 66 (Fig. 3), this leg being, of course, restrained against clockwise movement by the abutment means 74. After the pin 78 has been removed, the operator may stand behind or below the elevator 22 and push upwardly thereon, which will result in movement of the pin 60 to the closed end of the slot 56 (Fig. 4). Because of the inherent weight characteristics of the legs 68 and 70 of the latch 66, a bias is effected which will cause the latch 66 to swing to the position of Fig. 4, thus clearing the obstructing leg 68 from the slot 56 and permitting the wagon elevator to move downwardly about its pivot at 24. The wagon 32 has been previously disconnected and the operator may allow the wagon elevator to descend to the ground, after which he may effect disconnection at the pivot 24.

In the reconnection of the coupling, the wagon elevator is raised to a position permitting alinement of the slot 56 with the pin 60, and further raising of the wagon elevator will permit the pin to pass to the closed end of the slot (Fig. 4), after which the operator may swing the latch to the position of Fig. 3 and release the wagon elevator, which will swing the latch so that the leg 68 engages the abutment means 64. This will temporarily establish the coupling and the pin 78 may be subsequently inserted, all of which makes disconnection and reconnection a relatively simple task.

It will be noted that the length of the slot 56 is equal to substantially the length of the leg 68 plus the thickness of the pin 60, enabling the latch leg 68 to clear the pin 60 in the position of Fig. 4.

Specific features and advantages of the invention not enumerated herein will undoubtedly occur to those versed in the art, as likewise will modifications and alterations in the preferred embodiment of the invention illustrated, all of which may be achieved without departing from the spirit and scope of the invention.

What is claimed is:

1. A coupling of the character described for detachably interconnecting first and second elements against separation under tension, comprising: a U-shaped member secured to the first element and having a bight and a pair of spaced apart legs extending in the direction of tension and defining a slot opening at one end in said direction; a connector secured to the second element and slidable in the slot to move out of the open end of the slot under tension unless restrained; a latch having a rigid elongated part with an end thereof proximate to the free end of one of the legs of the U; pivot means mounting the latch at said end on said free end of said one leg of the U for swinging the elongated part between a first position, in which the part extends across and obstructs the open end of the slot to restrain the connector and a second position in which the part extends toward the bight of the U and clear of the slot to permit movement of the connector into and out of the slot, the slot being of sufficient length that upon the connector being moved to the bight end of the slot the connector will be positioned to clear the free end of the elongated part when said part is swung between its first and second positions; means acting on the latch for biasing the part between its first and second positions; releasable means directly cooperative between the latch and the U-shaped member for normally retaining the part in its first position; abutment means on the other leg of the U against which the part abuts in its first position when tension is applied to the connector via the aforesaid second element.

2. The invention defined in claim 1, in which: each leg of the U is in the form of a closed loop including spaced apart walls and having its closed end at the same end of the U-shaped member as the open end of the slot; the latch is contained between said walls, being pivoted as aforesaid adjacent the closed end of said one leg of the U; and the closed end of the other leg of the U provides the abutment means.

References Cited in the file of this patent

UNITED STATES PATENTS

| | | |
|---|---|---|
| 573,724 | Thomson | Dec. 22, 1896 |
| 770,409 | Wood | Sept. 20, 1904 |
| 788,692 | Ammann | May 2, 1905 |
| 790,221 | McCune | May 16, 1905 |
| 806,216 | Van Wye | Dec. 5, 1905 |
| 856,795 | Morris | June 11, 1907 |
| 1,353,094 | Trumpour | Sept. 14, 1920 |
| 1,665,758 | Upham | Apr. 10, 1928 |
| 2,202,867 | Rankin | June 4, 1940 |
| 2,414,725 | Dunn | Jan. 21, 1947 |